United States Patent
Broussard et al.

(10) Patent No.: US 7,036,045 B2
(45) Date of Patent: Apr. 25, 2006

(54) METHOD AND SYSTEM FOR ISOLATING EXCEPTION RELATED ERRORS IN JAVA JVM

(75) Inventors: Scott J. Broussard, Cedar Park, TX (US); Eduardo N. Spring, Round Rock, TX (US)

(73) Assignee: International Business Machines Corporation, Armonk, NY (US)

( * ) Notice: Subject to any disclaimer, the term of this patent is extended or adjusted under 35 U.S.C. 154(b) by 551 days.

(21) Appl. No.: 10/105,131

(22) Filed: Mar. 21, 2002

(65) Prior Publication Data

US 2003/0182596 A1    Sep. 25, 2003

(51) Int. Cl.
*G06F 11/00*    (2006.01)
(52) U.S. Cl. ............................ 714/37; 714/38; 717/124
(58) Field of Classification Search ............. 714/34, 714/37, 45, 46, 47, 48, 57; 717/124–138
See application file for complete search history.

(56) References Cited

U.S. PATENT DOCUMENTS

| 6,289,446 | B1* | 9/2001 | Nilsson ...................... 712/244 |
| 6,543,011 | B1* | 4/2003 | Schumacher et al. ......... 714/45 |
| 2002/0198983 | A1* | 12/2002 | Ullmann et al. ............ 709/224 |

OTHER PUBLICATIONS

Lauinger, T., "JLog: A Java Logging Framework," Java Report, vol. 5, No. 8, Aug. 2000, pp. 42-50.

* cited by examiner

*Primary Examiner*—Scott Baderman
*Assistant Examiner*—Timothy M. Bonura
(74) *Attorney, Agent, or Firm*—Mark Walker; Hoffman, Warnick & D'Alessandro LLC

(57) ABSTRACT

A system and method for dumping all or some exceptions in an object-oriented environment. The invention includes a Java virtual machine comprising: a system for enabling a verbose exceptions mode; and a system for dumping exceptions that occur during the running of the executable code when the verbose exceptions mode is enabled.

18 Claims, 4 Drawing Sheets

```
==================================================
java.rmi.ServerException: RemoteException occurred in server thread;
nested exception is: com.ibm.ejs.container.UncheckedException: ;
    nested exception is: java.lang.NullPointerException
    com.ibm.ejs.container.UncheckedException: ;
    nested exception is: java.lang.NullPointerException
java.lang.NullPointerException ==================================================
java.lang.ClassCastException:
        at com.ibm.case.TestBean.callEventNotify(TestBean.java:533)
        at java.lang.reflect.Method.invoke(Native Method)
        at
com.ibm.test.QueuedObjectEvent.directDispatch(QueuedObjectEvent.java:267)
        at
com.ibm.test.QueuedObjectEvent.dispatch(QueuedObjectEvent.java:287)
        at com.ibm.test.EventQueue.process(QueuedObjectEvent.java:427)
        at com.ibm.test.EventQueueThread.run(QueuedObjectEvent.java:691)
==================================================
java.lang.SecurityException
        at
com.ibm.ejs.security.SecurityManager.checkExit(SecurityManager.java:123)
        at java.lang.Runtime.exit(Runtime.java:106)
        at java.lang.System.exit(System.java:730)
        at
com.ibm.etools.websphere.tools.runner.CommonServerRunner.endProcess(CommonSe
rverRunner.java)
        at
com.ibm.etools.websphere.tools.runner.CommonServerRunner$Communicator.run(Co
mmonServerRunner.java)
        at java.lang.Thread.run(Thread.java:498)
================================================== java.lang.IllegalArgumentException: addChild: Child name 'hostname' is not
unique
        at
org.apache.catalina.core.ContainerBase.addChild(ContainerBase.java:779)
        at
org.apache.catalina.core.StandardEngine.addChild(StandardEngine.java:265)
        at
org.apache.catalina.connector.warp.WarpConfigurationHandler.deploy(WarpConfi
gurationHandler.java:268)
        at
org.apache.catalina.connector.warp.WarpConfigurationHandler.handle(WarpConfi
gurationHandler.java:117)
        at
org.apache.catalina.connector.warp.WarpConnection.run(WarpConnection.java:18
9)
        at java.lang.Thread.run(Thread.java:484)

==================================================
java.lang.ArrayIndexOutOfBoundsException
        at case2.throwit(case2.java, Compiled Code)
        at case2.send(case2.java, Compiled Code)
        at case1.main(case1.java, Compiled Code)

METHOD AND SYSTEM FOR ISOLATING EXCEPTION RELATED ERRORS IN JAVA JVM

BACKGROUND OF THE INVENTION

1. Technical Field

The present invention relates generally to isolating errors in a software runtime environment, and more particularly, to a system and method for dumping exceptions during execution of a computer program in an interpreted language environment.

2. Related Art

Identifying runtime problems in a software program can be a very time consuming and expensive process given the often inherent complexity of software. Difficulties arise because problems are often hard to identify and are not always evident when a program is executing. Such problems result not only in a costly process of isolating errors, but also result in low performance when such errors are unexpected or go undetected.

In many environments, runtime errors result in an "exception," which can be dealt with during runtime to allow the program to continue executing. In a Java environment, for instance, when a runtime error occurs, the program can "throw an exception," and a handler can be provided to "catch" the exception and deal with it. If a handler is not provided, the program will terminate and output some type of error message.

Problems often occur, however, because many applications write code that catch exceptions that perform some type of default behavior. In Java, for example, exceptions are sometimes caught generically, such as with the statement:

catch (Exception e) {/* do nothing */}.

In this case, nothing is done except to consume the exception. While this may work fine for cases where the exceptions are intended, it may be insufficient to handle other, perhaps unintended, exceptions such as a ClassNotFoundException. In cases where the exception is due to some user error (e.g., configuration problem, missing classpath item, etc.), the program will behave badly, and there may be no visible sign of what the problem is.

In addition, many times applications use exceptions to pass back errors or event notifications (e.g., correct responses). The use of exceptions in this manner can be a performance overhead, particularly in a system where there is a large stack depth. In such cases, the creation and throwing of each exception requires the stack, at the point of the throw, to be captured and saved in the exception. Unfortunately, without analyzing when, where, and how such exceptions are used, it may be difficult to identify or quantify any loss of performance.

Accordingly, a need exists for a system and method that can analyze exceptions generated during runtime to determine problems, isolate errors, and improve performance.

SUMMARY OF THE INVENTION

The present invention addresses the above-mentioned problems, as well as others, by providing a system, method and program product, such as a Java virtual machine (JVM), that can be enabled to dump all exceptions in a verbose mode. In a first aspect, the invention provides an interpreter for generating and running an application, the interpreter comprising: a system for enabling a verbose exceptions mode; and a system for dumping exceptions that occur during the running of the application when the verbose exceptions mode is enabled.

In a second aspect, the invention provides a program product stored on a recordable medium for generating and running an application, the program product comprising: program code configured to enable a verbose exceptions mode; and program code for dumping exceptions that occur during the running of the application when the verbose exceptions mode is enabled.

In a third aspect, the invention provides a method for dumping exceptions during the running of an application in an interpreted language environment, comprising: inputting an initialization option; enabling a verbose exceptions mode; running the application; generating an exception when an error occurs; and outputting an exception stack trace.

In a fourth aspect, the invention provides a compiler system for generating an executable program configured to dump exceptions, wherein the compiler system comprises a runtime library having a verbose exceptions module, wherein the verbose exceptions module includes: a system for reading in an initialization option that enables a verbose exceptions mode; and a system for causing exceptions to be dumped when the verbose exceptions mode is enabled.

BRIEF DESCRIPTION OF THE DRAWINGS

These and other features of this invention will be more readily understood from the following detailed description of the various aspects of the invention taken in conjunction with the accompanying drawings in which:

FIG. 2 depicts an exemplary exception dump in accordance with the present invention.

Figure 1:
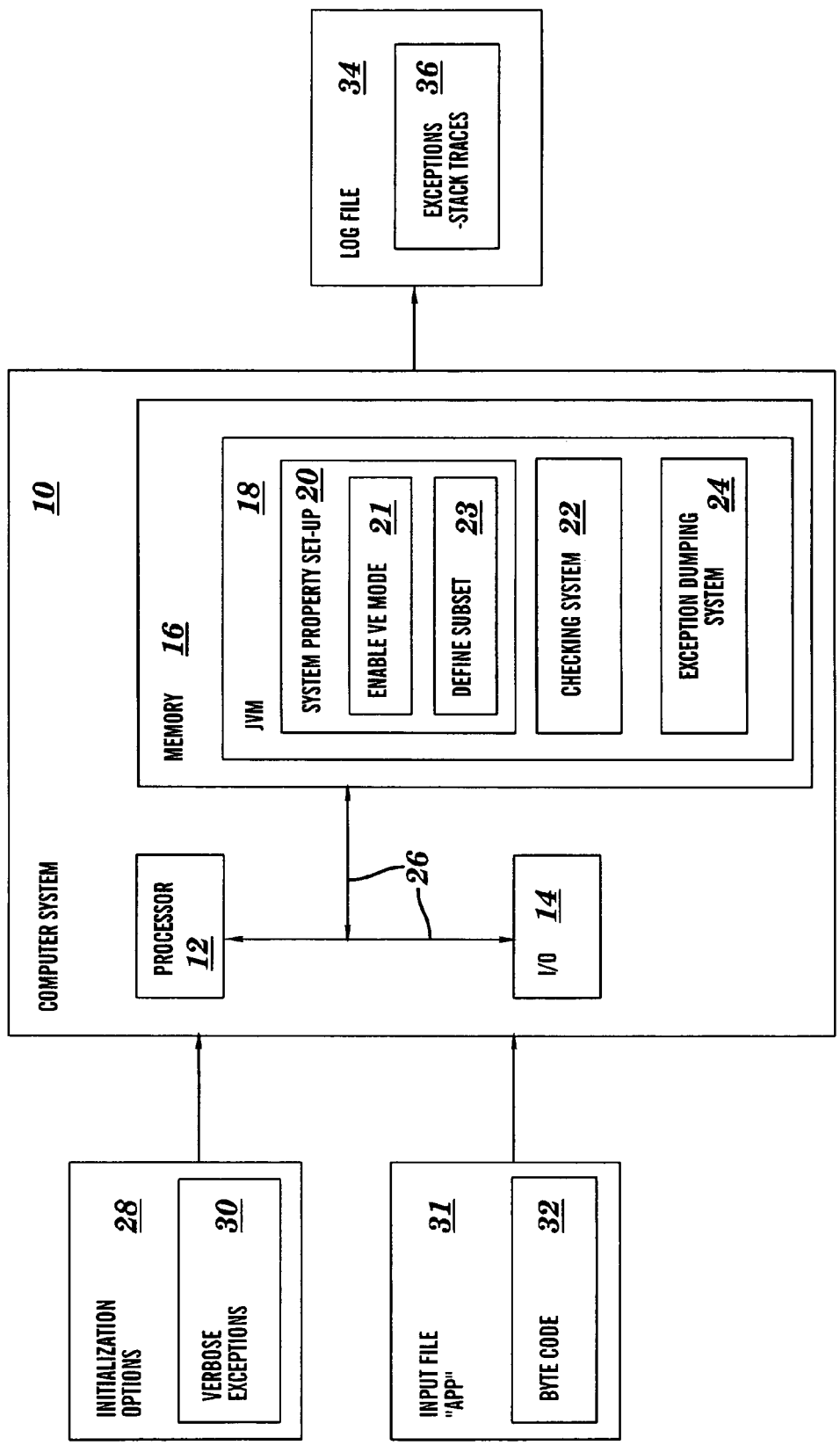
FIG. 1 depicts a computer system having a Java virtual machine in accordance with the present invention.

The drawings are merely schematic representations, not intended to portray specific parameters of the invention. The drawings are intended to depict only typical embodiments of the invention, and therefore should not be considered as limiting the scope of the invention. In the drawings, like numbering represents like elements.

DETAILED DESCRIPTION OF THE INVENTION

Referring now to the drawings, FIG. 1 depicts a computer system 10 having a Java virtual machine 18 that can generate a log file 34 containing a dump of exceptions 36 that occur while an application is running. By providing such a log file 34, problems in the application related to exceptions can be more easily diagnosed.

Computer system 10 generally comprises memory 16, input/output (I/O) 14, a processor 12, external devices/resources (not shown) and bus 26. Memory 16 may comprise any known type of data storage and/or transmission media, including magnetic media, optical media, random access memory (RAM), read-only memory (ROM), a data cache, a data object, etc. Moreover, memory 16 may reside at a single physical location, comprising one or more types of data storage, or be distributed across a plurality of physical systems in various forms. Processor 12 may likewise comprise a single processing unit, or be distributed across one or more processing units in one or more locations, e.g., on a client and server.

I/O 14 may comprise any system for exchanging information with an external source. External sources may comprise any known type of external device, including memory, a CRT, LED screen, hand-held device, keyboard, mouse, voice recognition system, speech output system, printer, monitor, facsimile, pager, etc. Bus 26 provides a communication link between each of the components in the computer system 10 and likewise may comprise any known type of transmission link, including electrical, optical, wireless, etc. In addition, although not shown, additional components, such as cache memory, communication systems, system software, etc., may be incorporated into computer system 10.

Stored in memory 16 is an enhanced Java virtual machine (JVM) 18 in the form of a software program. In general, JVM 18 reads in an input file "APP" 31 containing byte code 32, interprets the byte code 32, generates executable code or instructions (i.e., an application), and causes the executable instructions to be run by processor 12. It is recognized that JVM's represent just one type of interpreted language environment, and is described herein for exemplary purposes only. Accordingly, it should be understood that any type of interpreter adapted to include the inventive features described herein clearly falls within the scope of this invention. Furthermore, given that JVM's are well known in the art, their basic functionality will not be discussed in detail herein.

As noted above, JVM 18 can be enabled to generate log file 34 (i.e., an exception dump), which contains a list of exceptions 36 that occurred while an application was executing. Along with the list of exceptions 36, associated stack traces and other relevant information may be provided. An exemplary exception dump is shown in FIG. 2. It should be understood that the format depicted in FIG. 2 is for exemplary purposes only, and that any output format could be provided. In addition, exceptions need not be outputted to a log file 34, but rather, could be outputted to any type of I/O device (e.g., a CRT), to a program that analyzes the results, etc.

Returning to FIG. 1, initialization options 28 are utilized to setup JVM's system properties to generate log file 34. Specifically, a "verbose exceptions" option 30, which may comprise, e.g., a command line option or switch, is inputted into JVM 18 and enables a verbose exceptions mode within JVM 18. For example, in order to run the input file "APP" 31 in a verbose exceptions mode, a command line option as follows may be utilized:

>Java-verbose:exceptions APP

It is understood that verbose exceptions option 30 may be implemented in any manner and is not limited to a command line switch. For example, in an integrated development environment, the verbose exceptions option 30 may be implemented via a drop down menu.

In addition to simply turning the verbose exceptions mode on, the verbose exceptions option 30 also allows the user to specify different levels of granularity regarding the types of exceptions to be dumped. To achieve this, the user specifies a subset of exceptions within the verbose exceptions option 30. For example, the user may just want to dump certain classes of exceptions, derivatives of classes, etc. This can be achieved by, for instance, using additional subset options on the command line switch, such as:

>Java-verbose:exceptions APP [{class1, class2, class3, . . . }]

In this case, only the selected class or classes exceptions would be dumped.

When the verbose exceptions option 30 is turned on, the JVM system properties set-up 20 will enable the verbose exceptions mode 21 and define the appropriate exception subset 23 in JVM 18. Then, when the application is run, and an error occurs that creates an exception, a checking system 22 will identify exception object classes that match the defined exception subset. The checking system 22 can be implemented as a software routine that compares the object class of an exception with the object classes defined in the exception subset. If a match is found, then the information associated with the exception (e.g., stack trace) is collected from the JVM 18 and outputted by exception dumping system 24 to log file 34. Exception dumping system 24 may be implemented, for instance, by a software routine that opens log file 34 and writes the exception data to the log file 34.

Figure 3:
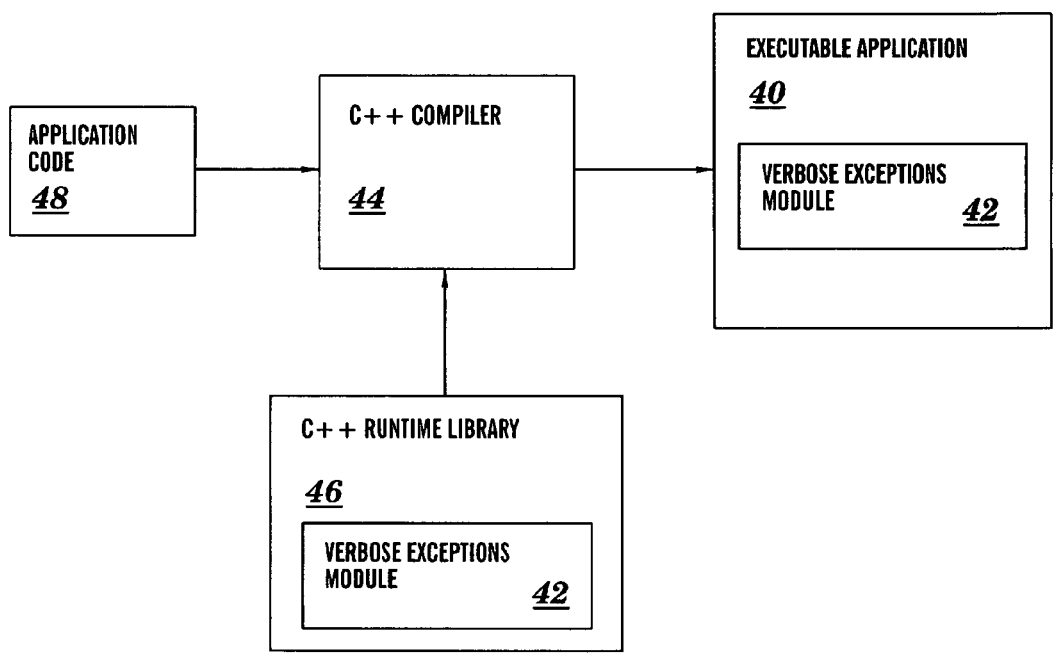
FIG. 3 depicts a compiler system in accordance with the present invention.

In addition to interpreted language environments, the process for dumping exceptions can be implemented in non-interpreted environments. For example, as shown in FIG. 3, exception dumping can be implemented with an object-oriented compiler, such as a C++ compiler 44. In a C++ environment, a C++ runtime library 46 containing a verbose exceptions module 42 is provided and is linked with the application code 48 by the C++ compiler 44. The result is an executable application 40 having the verbose exceptions module 42. The verbose exceptions module 42 includes: (1) a system for reading in an initialization option (e.g., and environment variable) that enables a verbose exceptions mode; and (2) a system for causing exceptions to be dumped when the verbose exceptions mode is enabled.

Thus, when the application 40 gets executed, e.g., by computer system 10 of FIG. 1, the verbose exceptions module 42 checks for any environment variables or the like that would enable the exception dumping mode. If enabled, exceptions are dumped during runtime and output to a log file in a manner similar to that described above.

In one exemplary embodiment, the initialization option may be implemented during run time with environment variables, such as:

>CAPP verbose[{class1, class2, class3, . . . }], where: "CAPP" is an exectable application 40 created with C++ compiler 44; "verbose" causes the verbose exceptions mode to be enabled; and "class1, class2, class3, . . . " are the class exceptions that will be dumped. Thus, for instance, the command line >CAPP verbose[class1], would cause only class1 exceptions to be dumped when CAPP is executed.

Figure 4:
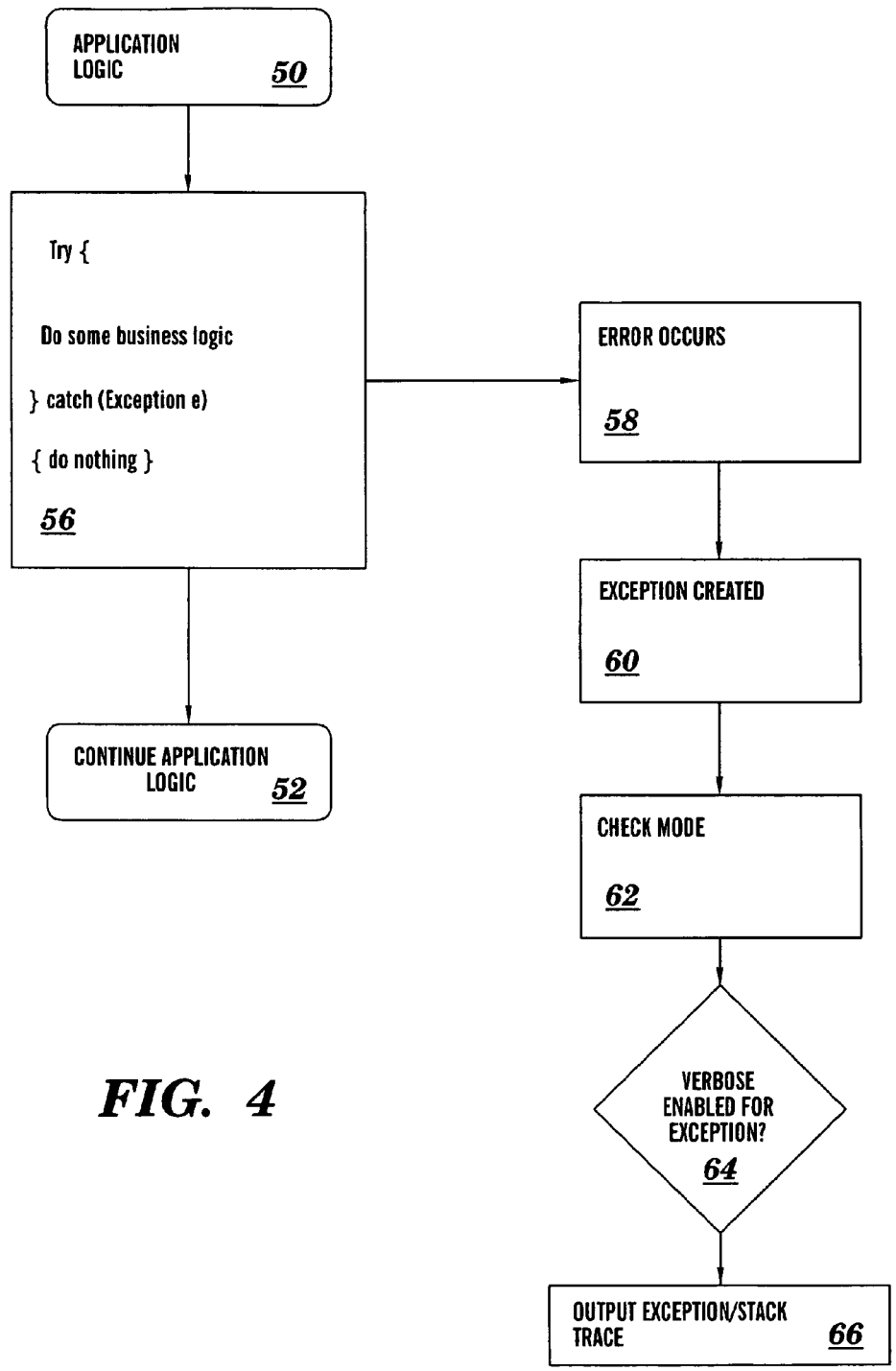
FIG. 4 depicts a method flow diagram according to the present invention.

Referring now to FIG. 4, a flow diagram depicting an exemplary methodology implementing verbose exceptions in an interpreted language environment is shown. Prior to execution of application logic 50, the verbose exceptions mode is enabled and an exception subset is defined (not shown). Within application logic 50 is a piece of code containing a "try-catch" block 56 to deal with any "Exception e" errors that might occur while "Do some business logic" is executed. If an error occurs 58, an exception is created 60, and the verbose exceptions mode is checked 62. If verbose is enabled for the exception 64, then the exception is output along with its stack trace 66, and the application logic continues 52.

It is understood that the present invention can be realized in hardware, software, or a combination of hardware and software. Moreover, the present invention can be realized in a centralized fashion in a single computerized workstation, or in a distributed fashion where different elements are spread across several interconnected systems (e.g., a network). Any kind of computer—or other apparatus adapted for carrying out the methods described herein—is suited. A typical combination of hardware and software could be a general purpose computer system with a computer program that, when loaded and executed, controls computer system 10 such that it carries out the methods described herein. Alternatively, a specific use computer system, containing specialized hardware for carrying out one or more of the functional tasks of the invention could be utilized. The present invention can also be embedded in a computer program product, which comprises all the features enabling the implementation of the methods described herein, and which—when loaded in a computer system—is able to carry out these methods. Computer program, software program, program, or software, in the present context mean any expression, in any language, code or notation, of a set of instructions intended to cause a system having an information processing capability to perform a particular function either directly or after either or both of the following: (a) conversion to another language, code or notation; and/or (b) reproduction in a different material form.

The foregoing description of the invention has been presented for purposes of illustration and description. It is not intended to be exhaustive or to limit the invention to the precise form disclosed, and obviously, many modifications and variations are possible. Such modifications and variations that may be apparent to a person skilled in the art are intended to be included within the scope of this invention as defined by the accompanying claims.

The invention claimed is:

1. An interpreter for generating and running an application, the interpreter comprising: a system for enabling a verbose exceptions mode; and a system for dumping exceptions that occur during the running of the application when the verbose exceptions mode is enabled; and initiating execution of the application; wherein the initialization option includes a command line switch.

2. The interpreter of claim 1, wherein the interpreter comprises a Java virtual machine.

3. The interpreter of claim 1, wherein the system for dumping exceptions dumps each exception to a log and includes a stack trace associated with each exception.

4. The interpreter of claim 1, wherein the system for dumping exceptions dumps all of the exceptions that occur during the running of the application.

5. The interpreter of claim 1, wherein the system for dumping exceptions dumps a subset of exceptions.

6. The interpreter of claim 5, wherein the subset of exceptions is selected from the group consisting of: a predetermined class type and a predetermined derivative of a class type.

7. The interpreter of claim 5, further comprising a system for receiving an initialization option that causes the verbose exceptions mode to be enabled and dictates what subset of exceptions will be dumped.

8. A program product stored on a recordable medium for generating and running an application, the interpreter comprising: program code configured to enabling a verbose exceptions mode; and program code configured to dump exceptions that occur during the running of the application when the verbose exceptions mode is enabled; and initiating execution of the application; wherein the initialization option includes a command line switch.

9. The program product of claim 8, further comprising program code configured to receive an initialization option that causes the verbose exceptions mode to be enabled and dictates a subset of exceptions to be dumped.

10. The program product of claim 8, further comprising a Java virtual machine.

11. The program product of claim 8, wherein the program code configured to dump exceptions dumps each exception to a log and includes a stack trace associated with each exception.

12. A method for dumping exceptions during the running of an application in an interpreted language environment, comprising: inputting an initialization option; enabling a verbose exceptions mode; initiating execution of the application; wherein the initialization option includes a command line switch; generating an exception when an error occurs; and outputting an exception stack trace associated with each exception.

13. The method of claim 12, wherein the step of enabling a verbose exceptions mode includes the step of defining an exception subset.

14. The method of claim 13, comprising the further step of checking the verbose exceptions mode after the exception is generated to determine if verbose exceptions mode is enabled for the exception.

15. A compiler system for generating an executable program configured to dump exceptions, wherein the compiler system comprises a runtime library having a verbose exceptions module, wherein the verbose exceptions module includes: a system for reading in an initialization option that enables a verbose exceptions mode; wherein the initialization option includes a command line switch; a system for causing exceptions to be dumped when the verbose exceptions mode is enabled.

16. The compiler system of claim 15, wherein the initialization option dictates a subset of exceptions to be dumped.

17. The compiler system of claim 15, further comprising a C++ compiler.

18. The compiler system of claim 15, wherein the dumped exceptions include a stack trace associated with each exception.

* * * * *